US012741430B2

(12) United States Patent
Chiang

(10) Patent No.: US 12,741,430 B2
(45) **Date of Patent: *Sep. 22, 2026**

(54) SYNTHETIC FIBER BALL

(71) Applicant: Samsonico USA, LLC., Conway, AR (US)

(72) Inventor: Shih-Chiang Chiang, Taipei City (TW)

(*) Notice: Subject to any disclaimer, the term of this patent is extended or adjusted under 35 U.S.C. 154(b) by 233 days.

This patent is subject to a terminal disclaimer.

(21) Appl. No.: 18/222,767

(22) Filed: Jul. 17, 2023

(65) Prior Publication Data

US 2023/0356478 A1 Nov. 9, 2023

Related U.S. Application Data

(60) Continuation-in-part of application No. 14/675,061, filed on Mar. 31, 2015, now Pat. No. 11,993,876, which is a division of application No. 13/909,560, filed on Jun. 4, 2013, now Pat. No. 8,992,356.

(51) Int. Cl.
*B29C 67/00* (2017.01)
*A63B 43/00* (2006.01)
*A63H 33/30* (2006.01)

(52) U.S. Cl.
CPC .............. *B29C 67/00* (2013.01); *A63B 43/00* (2013.01); *A63B 43/002* (2013.01); *A63H 33/30* (2013.01); *A63B 2208/12* (2013.01)

(58) Field of Classification Search
CPC ....... A63B 43/00; A63B 43/06; A63B 43/002; A63B 2208/12; A63H 33/30
See application file for complete search history.

(56) References Cited

U.S. PATENT DOCUMENTS 1,548,531 A * 8/1925 Knight ............... A63B 37/0073 428/11
4,756,529 A * 7/1988 Stillinger .............. A63F 9/0278 446/268
4,962,926 A * 10/1990 Chen ...................... A63B 43/00 446/490
5,516,099 A * 5/1996 Strong ................. A63B 67/002 473/614
5,611,297 A * 3/1997 Veloce ................. A01K 15/025 119/708
5,962,086 A * 10/1999 Offen ....................... D04D 7/06 446/26
6,280,356 B1 * 8/2001 Sandeen ................ A63B 43/00 473/614
6,701,592 B2 * 3/2004 Veloce ..................... D04D 7/06 223/46

(Continued)

FOREIGN PATENT DOCUMENTS

GB 2384849 A * 8/2003 ............. A41G 1/005

*Primary Examiner* — Eugene L Kim
(74) *Attorney, Agent, or Firm* — Joe D. Calhoun

(57) ABSTRACT

A synthetic fiber ball and method of manufacturing the same is disclosed. The fiber ball includes a plurality of fibers having a predetermined length bound together with a fastening fiber at a central core. The fibers extend outwardly from the fastening fiber at the central core to form a generally spherical shaped ball. The fibers are heat shrunk in a spinning oven from a generally cylindrical shaped fiber bundle having a predetermined diameter to form the fiber ball. An illumination element is thereafter inserted into the fiber ball, for lighting the fiber ball when desired or upon impact.

20 Claims, 4 Drawing Sheets

(56) References Cited

U.S. PATENT DOCUMENTS

| | | | | |
|---|---|---|---|---|
| 8,992,356 | B2 * | 3/2015 | Syme | A63H 33/30 473/614 |
| D728,713 | S * | 5/2015 | Phillips | D21/707 |
| 10,953,291 | B2 * | 3/2021 | Savard | A63B 67/183 |
| 11,993,876 | B2 * | 5/2024 | Syme | A63B 45/00 |
| 2007/0270233 | A1 * | 11/2007 | Ruston | A63B 37/0003 473/280 |
| 2010/0311528 | A1 * | 12/2010 | Golden-Morace | A63H 33/18 28/143 |

* cited by examiner 10
12
14

22
12
24

SYNTHETIC FIBER BALL

CROSS REFERENCE TO RELATED APPLICATIONS

The present application is a continuation in part of (and claims the benefit of filing-date priority of) utility patent application Ser. No. 14/675,061 filed 31 Mar. 2015, which was a divisional of application Ser. No. 13/909,560 filed on Jun. 4, 2013 (now U.S. Pat. No. 8,992,356) and was accorded the 2013 filing-date priority thereof.

FIELD OF THE INVENTION

The present invention relates generally to a ball, and more particularly, to a synthetic fiber ball that looks, feels, and sounds like a snowball. The present invention also relates to improvements endowing the so-called indoor snowball with lighting functionalities facilitating use of the indoor snowball in low-light or darkened environments.

BACKGROUND

Playing with snowballs is a childhood past time that many children that have the opportunity do. Unless there is snow on the ground, children, and adults for that matter, cannot play with snowballs. In addition, children must go outside to play with snowballs if snow is on the ground and weather conditions may make such ventures unhealthy. As such, a need exists for a way to play with a snowball like object without the need to have snow and venture outside in dangerous weather conditions.

SUMMARY OF THE INVENTION

A fiber ball is disclosed that looks like a snowball, feels like a snowball and sounds like a snowball when compressed. In addition, a method of manufacturing a fiber snowball is disclosed. Additionally, the indoor snowball of the present invention is equipped with an illumination element such as a battery powered light source capable of illuminating upon impact with a target structure, or illuminating when switched on by the user.

BRIEF DESCRIPTION OF THE DRAWINGS

The invention is further elucidated in the following on the basis of an exemplary embodiment shown in the drawings.

DETAILED DESCRIPTION OF THE INVENTON

Figure 1:
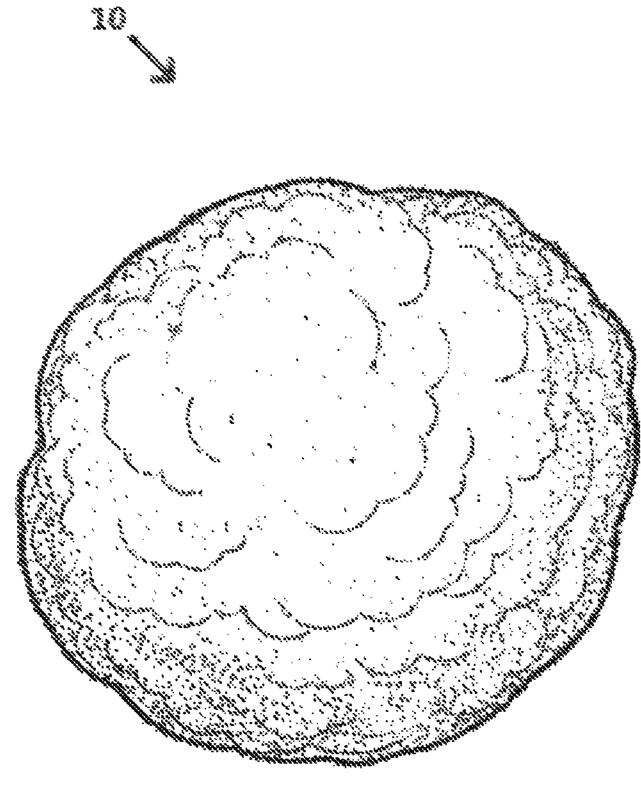
FIG. 1 illustrates a fiber snowball.

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprises" and/or "comprising", or "includes" and/or "including", or "have" or "having", when used in this specification, specify the presence of stated features, regions, integers, steps, operations, elements and/or components, but do not preclude the presence or addition of one or more other features, regions, integers, steps, operations, elements, components and/or groups thereof.

For the sake of simplicity and to give the claims of this patent application the broadest interpretation and construction permitted, the conjunctive "and" may also be taken to include the disjunctive "or," and vice versa, whenever necessary to give the claims of this patent application the broadest interpretation and construction permitted. For the same reasons, when the plural form is used, it may be taken to include the singular form, and vice versa.

It will be understood that, although the terms first, second, third, etc. may be used herein to describe various elements, these elements should not be limited by these terms. These terms are only used to distinguish one element from another element. Likewise, synonyms for the same element, term or concept may be used only to distinguish one similar element from another, unless the context clearly indicates otherwise.

The disclosure herein is not limited by construction materials or particular illumination elements to the extent that other materials or illumination elements satisfy the structural and/or functional requirements. For example, unless stated otherwise, any material may be used so long as it satisfies the functional and structural requirements for which it is being used. In one embodiment, the device is constructed of cut bundles of synthetic fibers, each fiber being formed by forcing synthetic material through a spinneret; however, unless stated otherwise, any fibers having similar characteristics after being heated in a spinning oven may suffice as well. Likewise, the disclosed invention is not limited by any construction process or method, unless so stated. In another embodiment, the illumination element may be selected from one or more of a group of elements sharing illumination function and structures.

A device that is configured in a certain way is configured in at least that way, but it can also be configured in other ways than those specifically described.

The terms "comprise" (and any form of comprise, such as "comprises" and "comprising"), "have" (and any form of have, such as "has" and "having"), and "include" (and any form of include, such as "includes" and "including") are open-ended linking verbs. As a result, an apparatus that "comprises," "has," or "includes" one or more elements possesses those one or more elements, but is not limited to possessing only those elements. Likewise, a method that "comprises," "has," or "includes" one or more steps possesses those one or more steps, but is not limited to possessing only those one or more steps.

The feature or features of one embodiment may be applied to or found in other embodiments, even though not described or illustrated, unless expressly prohibited by this disclosure or the nature of the embodiment or feature(s).

Referring to FIG. 1, a synthetic or non-synthetic fiber ball (10) is disclosed that includes all of the qualities of a regular soft packed ball that can be used for a variety of indoor or outdoor games and entertainment. In one form, the synthetic ball (10) is formed having a generally circular or ball shape, but other shapes are envisioned, such as a football shape, for example. The synthetic ball (10) is soft, resilient, machine washable, and can be formed in a variety of sizes. In one form, the synthetic ball (10) is sold as a bundle of balls (10) that can be used in a simulated ball fight game that can be held indoors throughout the year. The synthetic balls (10) are soft and scrunchy that no matter how fast they are thrown, they will cause no discomfort upon impact. The synthetic balls (10) are designed to compress or deform upon impact to disperse energy and then recover to their original form after impact.

Synthetic fibers are fibers that are generally created as the result of research to improve naturally occurring animal and plant fibers. In general, synthetic fibers are created by forcing, usually through extrusion, fiber forming materials through holes (called spinnerets) into the air, forming a bead. Synthetic fibers can also be made from synthesized polymers or small molecules. Non-synthetic fibers are fibers that are formed from animals (such as cotton) and plant fibers.

Figures 2, 3:
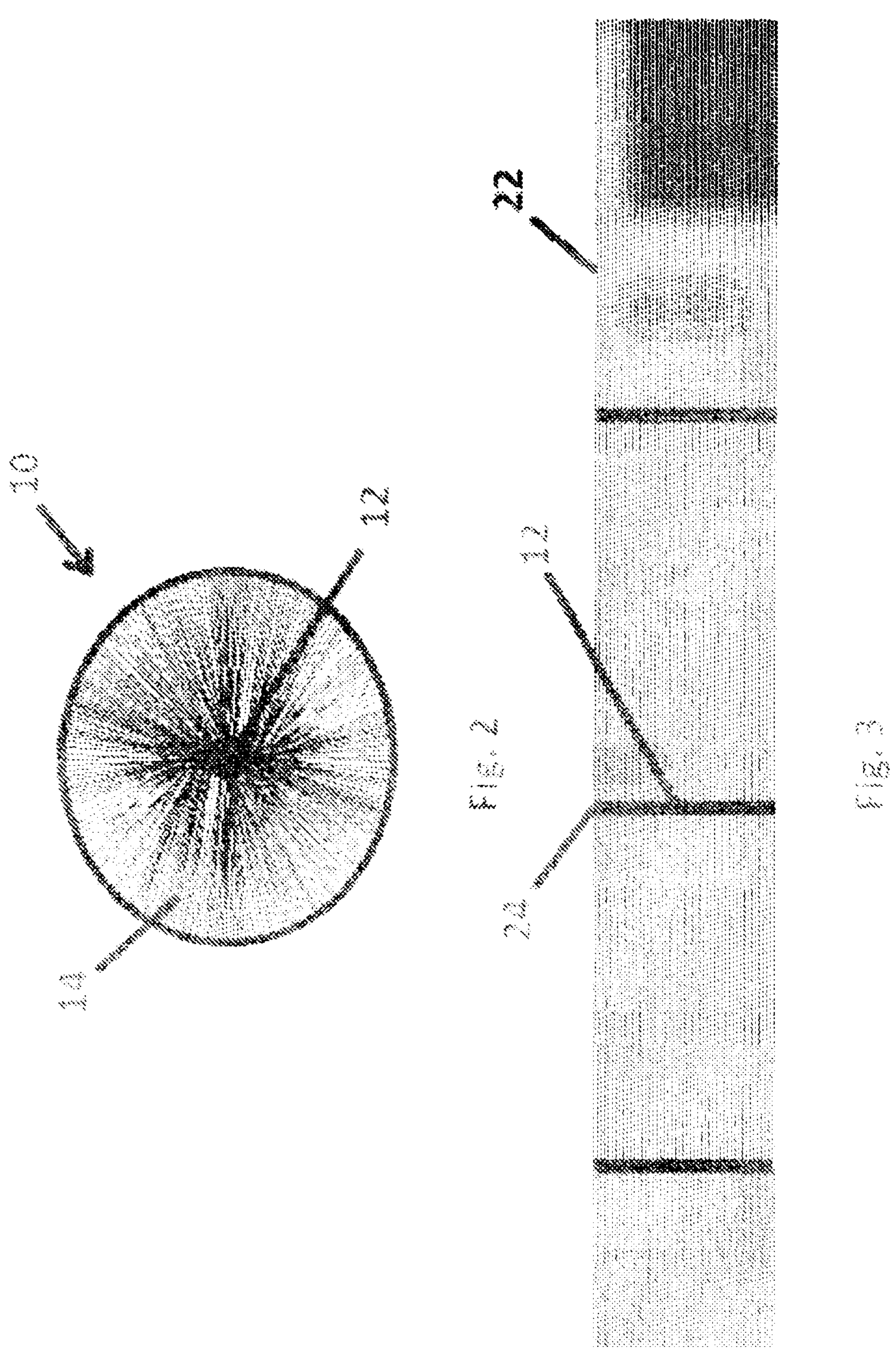
FIG. 2 illustrates a cross-section of the fiber snowball illustrated in FIG. 1.
FIG. 3 illustrates a fiber bundle strand.

Referring to FIG. 2, the synthetic ball (10) comprises a fastening fiber (12) that is located at a central core of the ball (10). In one form, the fiber ball (10) has a radius from the central core of the fiber ball (10) of about 1.5 inches. As such, the diameter of the fiber ball (10) is about 3 inches. Extending outwardly from the fastening fiber (12) are a plurality of fibers (14). The fibers (14) extend outwardly from the fastening fiber (12) such that a generally spherical shaped ball is formed. As set forth in greater detail below, the balls (10) are formed through a unique manufacturing process that creates a unique look and feel to the balls (10).

Referring to FIG. 3-6, the first step in creating the balls (10) is a process called fiber bundling 20. At this step, a fiber bundling machine (30) is used to bundle the fibers (14) to a predetermined size thereby creating a fiber bundle strand (22). As such, the fiber bundling machine (30) bundles the fibers (14) together by gathering each single fiber (14) on each fiber reel (32) together up into the fiber bundle strand (22). It should be appreciated that a plurality of fiber reels (32) are used to create the fiber bundle strand (22). In the preferred form, the fiber bundle (22) has a generally cylindrical or tubular shape with a diameter of about 2 inches. After the fiber bundle strand (22) is formed, the fastening fiber (12) is placed at predetermined points (24) along the fiber bundle strand 22. In one form, the fiber bundling machine (30) is used to place the fastening fiber (12).

Figure 4:
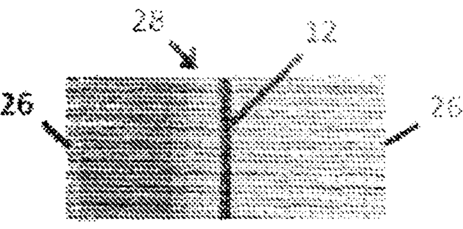
FIG. 4 illustrates a cut fiber bundle.
Figure 5:
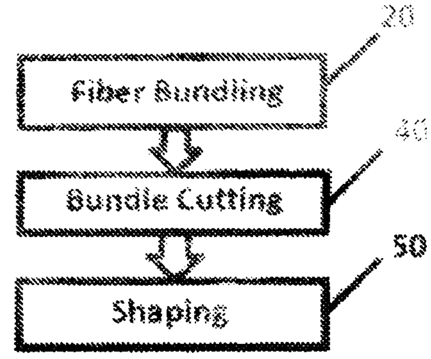
FIG. 5 illustrates the steps used to manufacture the fiber ball.
Figure 6:
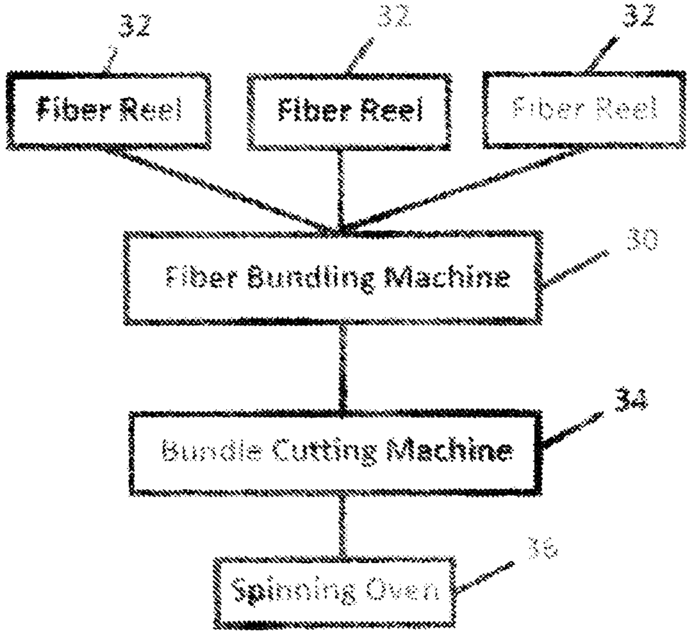
FIG. 6 illustrates the machines used to manufacture the fiber ball.

The next step in forming the balls (10) is a process of bundle cutting (40). In this step, a bundle cutting machine (34) is used to cut the fiber bundle strand (22) at a required length. The distance from the fastening fiber (12) to both cut ends (26) must be equal. In one form, the distance from the fastening fiber (12) to both cut ends (26) is about 2.5 inches. Equal distance makes the fiber ball (10) round after the shaping oven process is complete. Non-equal distance will result in non-round fiber balls. As a result of this step, a generally cylindrical shaped cut fiber bundle (28) is formed which is illustrated in FIG. 4.

Once the generally cylindrical shaped cut fiber bundles (28) are formed, the next step in the process of creating the fiber balls (10) is shaping (50). At this step, a spinning oven (36) is used to shape the generally cylindrical shaped cut fiber bundles (28) into the fiber ball (10). This process is very critical to make the fiber ball (10) feel like a snowball and sound like a snowball. In one form, the spinning oven (36) is set up at 80° C. and the cut fiber bundles (28) are heated for about 10-12 minutes. In another form, the spinning oven (36) is set up at 100° C. and the cut fiber bundles are heated for about 8 minutes. In yet another form, the spinning oven (36) is set up at 120° C. and the cut fiber bundles are heated for about 6 minutes. The spinning oven (36) is also set at a predetermined spinning speed to properly form the fiber ball (10).

The temperature and timing are critical to make the fiber ball (10) at just the right size and hardness. If the temperature is set up too high or the timing is longer, then the fiber ball (10) will be too hard and will not remain in a good looking snowball type shape and will not feel like a snowball or sound like a snowball. If the temperature is set too low or the timing is too short, then the fiber ball (10) will come out too soft and will not remain in a good looking shape and cannot come back to a ball shape after impact. The spinning oven (36) must also continuously spin during the shaping process. During the shaping process, the cut fiber bundles (28) shrink to form the fiber ball (10).

Figure 7:
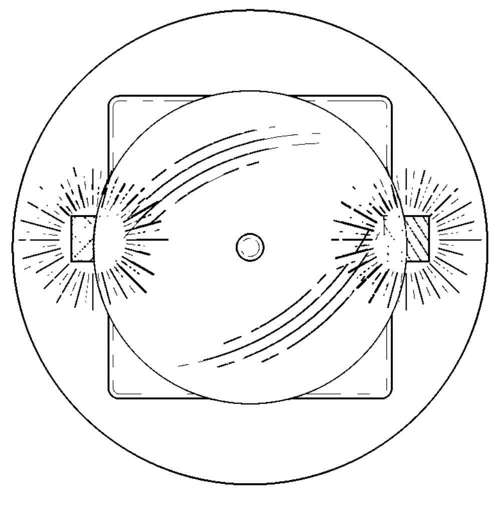
FIG. 7 illustrates a plan view of a representative sample of an illumination element apart from insertion into the fiber ball.
Figure 8:
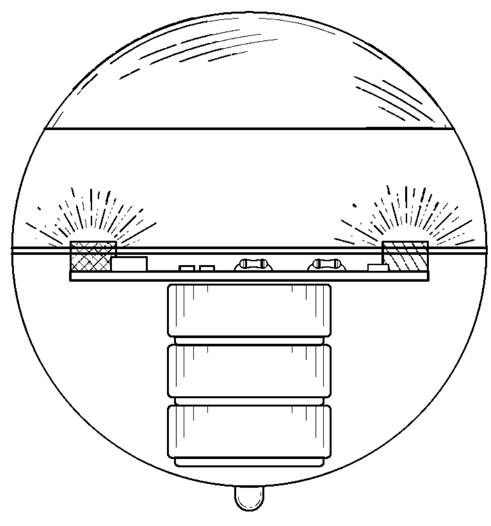
FIG. 8 illustrates an elevation view of the illumination element of FIG. 7, including the three batteries and pair of lights.
Figure 9:
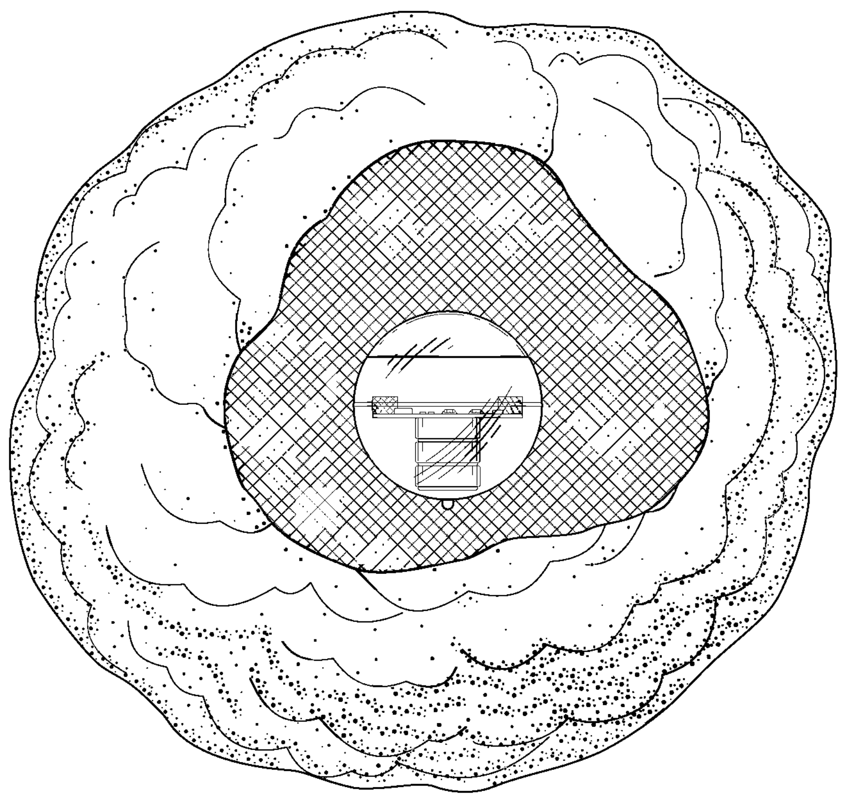
FIG. 9 illustrates a cutaway view of the illumination element of FIG. 7 embedded within the fiber snowball of FIG. 1.

Referring to FIGS. 7 and 8, the lighting element may include a manual on/off switch and/or an impact sensor (not shown) actuating the illumination upon impact of a sufficient force. The illumination may be continuous until turned off, or it may be continuous for a particular pre-determined duration, or it may be flashing intermittently either until turned off or for a particular pre-determined duration, or it may have a timer-delayed activation of any of those. Alternatively, said illumination characteristics may be randomly occurring, or dependent upon circumstances. For example, in one embodiment, an impact of at least a particular force may produce one set of illumination characteristics (such as constant illumination for a particular duration), whereas a lesser impact may produce a different set of illumination characteristics (such as intermittent/flashing illumination for a particular duration).

One general embodiment of the invention includes (comprises) a synthetic fiber ball that mimics the look and feel of a snowball, wherein the fiber ball is made from a cut fiber bundle made by bundling a plurality of individual fiber beads and binding them together, aligned side-by-side, with a fastening fiber at a central position or core. The bundled fibers are cut at a predetermined length from the fastening fiber so that the predetermined lengths of the bundled fibers on each side of the fastening fiber are approximately equal; the plurality of individual fibers extend outwardly and away from the fastening fiber at the central core to form a generally spherical shaped ball having a predetermined diameter, after the cut fiber bundle is heated in a spinning oven at a predetermined temperature and for a predetermined duration. After removal of the fiber ball from the oven, a battery powered illumination element is inserted into the ball. Adhesive(s) may be used to anchor the illumination element below the surface of the fiber ball.

To support and facilitate the lighting element and illumination improvements, an indoor snowball having a larger diameter and other characteristics may be preferred.

For example, polypropylene may be the fiber-making material pushed through the spinnerets to produce the beads, which are combined side-by-side to form each multi-bead fiber typically stored on a spool or reel. In one embodiment, each multi-bead fiber has a cross-sectional thickness of approximately 200 beads (combined side-by-side-aligned thickness). In one embodiment, the multi-bead fibers of approximately 15 to 25 spools are fed simultaneously into the bundling machine and bundled with fastening fibers encircling the plurality of fibers (also aligned side-by-side) at periodic intervals to produce each bundled multi-fiber strand. In one embodiment, the cylindrical or tubular multi-fiber bundle has a cross-sectional diameter of approximately 3,600 beads.

In one embodiment, the periodic interval between fastening fibers is approximately 5.12 inches (13 cm). The bundled multi-fiber strand is then bisected transversely in a manner essentially leaving equal-length halves of that 5.12 inches on both sides of each fastening fiber, yielding a plurality of cut multi-fiber bundles approximately 5.12 inches in length. After processing in a spinning oven, each cut bundle will yield a fiber ball having a diameter of about 2.5 inches to about 3 inches.

More particularly, the predetermined temperature of the spinning oven may be in the range of about 40° C. to about 80° C., and the predetermined duration of spinning may be in the range of about 2 minutes to about 4 minutes. Other temperatures and durations may be sufficient to form each cut fiber bundle into a fiber ball having the approximate size of a snowball, and mimicking the sound and tactile scrunchiness of a snowball when being manually packed or compressed. In one preferred embodiment, the predetermined temperature is about 60° C. and the predetermined duration is about 3 minutes.

After removing from the oven and allowing to cool, an illumination element is insert into the ball (near the center-core fastener), and attach with hot melt adhesive.

The illumination element includes a light source functionally connected to a battery. FIG. 8 depicts a representative sample of an illumination element, although other forms of illumination will suffice. It depicts a luminescent ball with button-type batteries such as those designated/sized as 3XAG10 or 3XLR1130. Having each fiber ball including an independent lighting characteristic increases the utility of the "indoor snowball" for use in low-light or dark conditions. In one preferred embodiment, the light source includes an LED light. The illumination element further includes an activation switch or mechanism of some sort. The activation switch activates functions selected from the group consisting of:

(a) manual on/off activation;
(b) impact or vibration activation; or
(c) timer-delayed activation; or combinations thereof.

The activation switch also may activate light source sub-functions selected from the group consisting of:

continuous illumination until manually deactivated;
continuous illumination for a pre-set timer duration;
continuous illumination until impact or vibration deactivation;
flashing illumination until manually deactivated;
flashing illumination for a pre-set timer duration;
flashing illumination until impact or vibration deactivation;
continuous illumination of the light source emitting a plurality of colors until manually deactivated;
continuous illumination of the light source emitting a plurality of colors for a pre-set timer duration;
continuous illumination of the light source emitting a plurality of colors until impact or vibration deactivation;
flashing illumination of the light source emitting a plurality of colors until manually deactivated;
flashing illumination of the light source emitting a plurality of colors for a pre-set timer duration; or
flashing illumination of the light source emitting a plurality of colors until impact or vibration deactivation, or combinations thereof.

The commonality of all embodiments is that the fiber ball feels like a snowball such that it emits tactile sensations to a user when the user manually compresses the fiber ball. The fiber balls look and feel like a snowball such that each's size and appearance resemble that of a snowball manually compressed by the user. The fiber ball also compresses upon impact and then recovers to its original form after impact.

A preferred embodiment comprises a synthetic fiber ball that mimics the look and feel of a snowball, including:

(a) a fiber ball made from a cut fiber bundle made by bundling a plurality of individual fiber beads formed by forcing fiber material through a spinneret; and
(b) binding the bundled fiber beads together with a fastening fiber at a central core; and
(c) cutting the bundled fiber beads at a predetermined length from the fastening fiber so that the predetermined lengths of the bundled fiber beads on each side of the fastening fiber are approximately equal;
(d) so that the plurality of individual fiber beads extend outwardly and away from the fastening fiber at the central core to form a generally spherical shaped ball having a predetermined diameter after the cut fiber bundle is heated in a spinning oven at a predetermined temperature and for a predetermined duration; and thereafter
(e) further inserting a battery powered illumination element into the ball.

The predetermined temperature is in the range of about 40° C. to about 80° C., and the predetermined duration is in the range of about 2 minutes to about 4 minutes. The illumination element includes a light source functionally connected to a plurality of batteries, such as (for example) button-type batteries such as 3XAG10 or 3XLR1130. The light source includes a pair of LED light, one flashing red and one flashing blue. The illumination element further includes an activation switch activating both LED lights upon impact, each light to flash for approximately 20 seconds before turning off.

Although the present disclosure and its advantages have been described in detail, it should be understood that various changes, substitutions and alterations can be made herein without departing from the spirit and scope of the invention as defined by the appended claims. The scope of the present application is not intended to be limited to the particular embodiments of the process, machine, manufacture, composition of matter, means, methods and/or steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. The scope of the present application is not intended to be limited to the particular embodiments of the process, machine, manufacture, composition of matter, means, methods and steps described in the specification.

While a preferred embodiment of the present invention has been described, it should be understood that various changes, adaptations and modifications may be made therein without departing from the spirit of the invention. Changes may be made in details, particularly in matters of shape, size, material, and arrangement of parts without exceeding the scope of the invention.

While the forms of apparatus herein described constitute preferred embodiments of the invention, it is to be understood that the invention is not limited to these precise forms of apparatus, and that changes may be made therein without departing from the scope and spirit of the invention as defined in the appended claims.

Those skilled in the art will recognize improvements and modification to the preferred embodiments of the present disclosure. All such improvements and modifications are considered within the scope of the concepts disclosed herein, and their equivalents, and the claims that follow.

The invention claimed is:

1. A synthetic fiber ball that mimics the look and feel of a snowball by emitting scrunchy tactile sensations when manually compressed, comprising a resilient fiber ball made from a cut fiber bundle made by bundling a plurality of individual fiber beads formed by forcing fiber material through a spinneret and binding said bundled fiber beads together with a fastening fiber at a central core and cutting said bundled fiber beads at a predetermined length from said fastening fiber so that said predetermined length of said bundled fiber beads on each side of said fastening fiber is approximately equal, so that said plurality of individual fiber beads extend outwardly and away from said fastening fiber at said central core to form a generally spherical shaped ball having a predetermined diameter of about three inches after said cut fiber bundle is heated in a spinning oven at a predetermined temperature and for a predetermined duration.

2. The fiber ball of claim 1, said ball further comprising an illumination element inserted within said ball and wherein said predetermined temperature is in the range of about 40° C. to about 80° C., and said predetermined duration is in the range of about 2 minutes to about 4 minutes.

3. The fiber ball of claim 2, wherein said predetermined temperature is about 60° C.

4. The fiber ball of claim 2, wherein said predetermined duration is about 3 minutes.

5. The fiber ball of claim 2, wherein said illumination element comprises a light source functionally connected to a battery.

6. The fiber ball of claim 5, wherein said light source comprises an LED light.

7. The fiber ball of claim 5, wherein said illumination element further comprises an activation switch.

8. The fiber ball of claim 7, wherein said activation switch activates functions selected from the group consisting of manual on/off activation, impact activation or timer-delayed activation, and combinations thereof.

9. The fiber ball of claim 8, wherein said activation switch activates light source sub-functions selected from the group consisting of continuous illumination until manually deactivated, continuous illumination for a pre-set timer duration, continuous illumination until impact deactivation, flashing illumination until manually deactivated, flashing illumination for a pre-set timer duration, flashing illumination until impact deactivation, continuous illumination of the light source emitting a plurality of colors until manually deactivated, continuous illumination of the light source emitting a plurality of colors for a pre-set timer duration, continuous illumination of the light source emitting a plurality of colors until impact deactivation, flashing illumination of the light source emitting a plurality of colors until manually deactivated, flashing illumination of the light source emitting a plurality of colors for a pre-set timer duration, or flashing illumination of the light source emitting a plurality of colors until impact deactivation, and combinations thereof.

10. The fiber ball of claim 1, wherein said fiber ball looks and feels like a snowball such that the fiber ball's size and appearance resemble that of a snowball manually compressed by the user.

11. The fiber ball of claim 1, wherein said fiber ball is operable to compress upon impact and then recover to the fiber ball's original form after impact.

12. A synthetic fiber ball that mimics the look and feel of a snowball by emitting scrunchy tactile sensations when manually compressed, comprising a fiber ball made from a cut fiber bundle made by bundling a plurality of individual fiber beads formed by forcing fiber material through a spinneret and binding said bundled fiber beads together with a fastening fiber at a central core and cutting said bundled fiber beads at a predetermined length from said fastening fiber so that said predetermined length of said bundled fiber beads on each side of said fastening fiber is approximately equal, so that said plurality of individual fiber beads extend outwardly and away from said fastening fiber at said central core to form a generally spherical shaped ball having a predetermined diameter of about three inches after said cut fiber bundle is heated in a spinning oven at a predetermined temperature and for a predetermined duration, said ball further comprising a battery powered illumination element inserted within said ball.

13. The fiber ball of claim 12, wherein said predetermined temperature is in the range of about 40° C. to about 80° C., and said predetermined duration is in the range of about 2 minutes to about 4 minutes.

14. The fiber ball of claim 13, wherein said predetermined temperature is about 60° C.

15. The fiber ball of claim 13, wherein said predetermined duration is about 3 minutes.

16. The fiber ball of claim 12, wherein said illumination element comprises a light source functionally connected to a battery.

17. The fiber ball of claim 16, wherein said light source comprises an LED light.

18. The fiber ball of claim 16, wherein said illumination element further comprises an activation switch.

19. The fiber ball of claim 16, wherein said activation switch activates functions selected from the group consisting of manual on/off activation, impact activation or timer-delayed activation, and combinations thereof.

20. The fiber ball of claim 19, wherein said activation switch activates light source sub-functions selected from the group consisting of continuous illumination until manually deactivated, continuous illumination for a pre-set timer duration, continuous illumination until impact deactivation, flashing illumination until manually deactivated, flashing illumination for a pre-set timer duration, flashing illumination until impact deactivation, continuous illumination of the light source emitting a plurality of colors until manually deactivated, continuous illumination of the light source emitting a plurality of colors for a pre-set timer duration, continuous illumination of the light source emitting a plurality of colors until impact deactivation, flashing illumination of the light source emitting a plurality of colors until manually deactivated, flashing illumination of the light source emitting a plurality of colors for a pre-set timer duration or flashing illumination of the light source emitting a plurality of colors until impact deactivation, and combinations thereof.

* * * * *